Patented Oct. 1, 1940

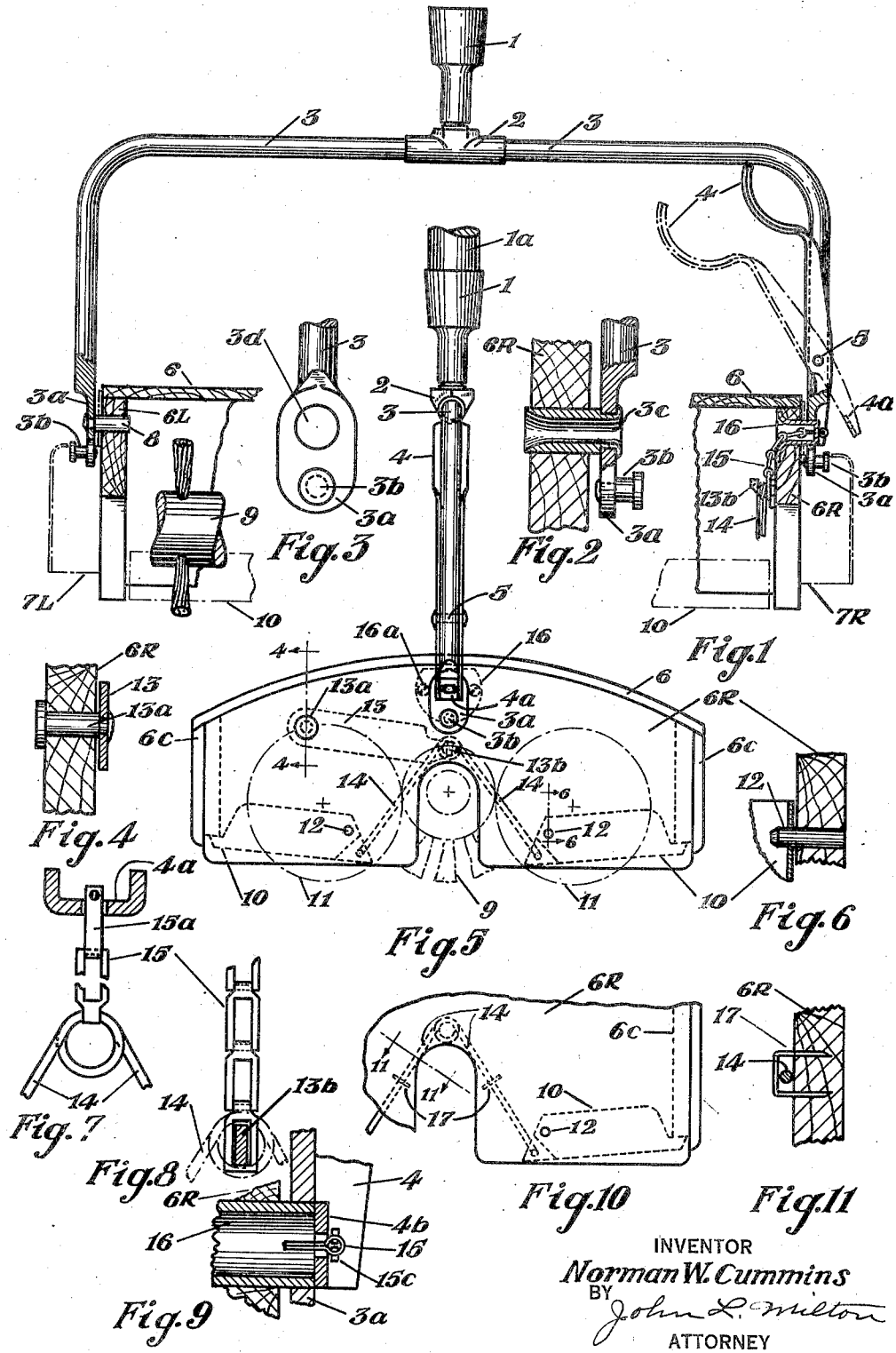

2,216,184

UNITED STATES PATENT OFFICE 2,216,184

CARPET SWEEPER

Norman W. Cummins, Louisville, Ky.

Application June 30, 1938, Serial No. 216,687

6 Claims. (Cl. 15—41)

My invention relates to improvements in carpet sweeper constructions, and more particularly to improvements in the construction and arrangement of dust-pan operating mechanisms.

The principal object of my invention is to place the dust pan operating lever in an accessible and convenient location on the sweeper so as to facilitate operation thereof.

A further object of my invention is to provide a dust pan operating mechanism that is easily operated and positive in its action.

A still further object of my invention is to arrange the dust pan operating lever so that it is carried by the bail or bail carried operating handle of the sweeper.

A still further object of my invention is to provide a relatively simple, practical and efficient construction that will facilitate assembly and reduce manufacturing costs.

The advantages of these and other objects of my invention will be more apparent as the following description is read in connection with the accompanying drawing illustrating one embodiment of my invention, in which:

Figure 1 is a partial sectional elevation taken along the transverse center line of a sweeper embodying the invention;

Figure 2 is an enlarged sectional view of a modified form of a hollow pintle through which the flexible actuating connection 15 between the actuating lever 4 and dump spring 14 passes;

Figure 3 is an enlarged plan view of the end of the bail adjacent to hollow pintle, illustrating the manner in which the pivoted ends of the bail are enlarged to accommodate a suitable bearing;

Figure 4 is an enlarged partial sectional view taken along lines 4—4 of Fig. 5, illustrating the manner in which the spring lever 13 is pivotally mounted on the end partition 6R;

Figure 5 is a partial end view of the sweeper illustrating the relation between the dump pan spring 14, spring lever 13 and actuating lever 4;

Figure 6 is an enlarged partial sectional view taken along lines 6—6 of Fig. 5 illustrating the manner in which the dump pans 10 are pivotally mounted on the respective end partitions 6R and 6L;

Figure 7 is an enlarged partial plan view illustrating a modified form of attaching chain 15 to spring 14 and actuating lever 4, when the spring lever 13 is not used as illustrated in Figure 10;

Figure 8 is an enlarged partial plan view illustrating the manner in which chain 15 is attached to the projection 13b of spring lever 13, when the spring lever 13 is used as illustrated in Figure 5;

Figure 9 is an enlarged partial sectional view of the hollow pintle illustrated in Figure 1, illustrating the manner in which chain 15 is attached to actuating lever 4, when spring lever 13 is used;

Figure 10 is a partial end view of the sweeper showing a modified manner of guiding spring 14 by staples 17, when the spring lever 13 is not used; and, Figure 11 is an enlarged partial sectional view taken along lines 11—11 of Figure 10 illustrating the relation between staple 17 and spring 14.

The invention is illustrated, in the foregoing designated drawing, in connection with a conventional dust pan spring arrangement, wherein the ends of an inverted loop spring are secured to opposite dust pans. Ordinarily, two such springs are provided, one at each end of the sweeper housing, but, in the drawing illustrating the invention, only one such spring is shown. Normally these springs act to bias the dust pans to their closed positions. To dump the dust pans, it is customary to raise the loop of one of the dust pan springs, and thereby pull the dust pans to an open position. To raise the spring loop, ordinarily a lever pivoted in one end of the sweeper housing is provided; one end of the lever being attached to the spring loop, while the other end of the lever being arranged to be depressed by the operator.

This arrangement has been found to be objectionable in that the operator is required to hold the sweeper handle and steady the sweeper housing while actuating the lever. Limitations controlled by the practical width of the sweeper housing do not provide a satisfactory lever ratio for the housing carried, actuating lever. Accordingly, considerable pressure is required to raise the spring loop. A more serious objection resides in the very awkward and clumsy operation of the dust pan actuating lever carried by the housing. Accordingly, since the success of a sweeper depends upon frequent and regular cleaning of the dust pans, the dump pan actuating mechanism has become a problem of serious concern.

To overcome these and other lesser objections not specifically enumerated, I have arranged the actuating lever so that it is carried by the bail or bail carried handle of the sweeper.

This arrangement enables the operator to, in effect, ignore the relative position of the housing, when actuating the bail carried actuating lever.

Placing the lever on the bail of the sweeper has made possible a very desirable lever ratio, and a very improved finger grip, so that the lever may be actuated either by pulling or pushing according to the preference of the operator.

Thus, my invention provides for simple and easy operation of the dust pan actuating lever, and in a manner that is more graceful and natural for the operator.

Referring now in detail to the accompanying drawing, it will be observed that the sweeper housing consists of the usual top member 6, end partitions 6R and 6L, and connecting side walls 6c.

In Figure 1 it will be observed that the handle 1a is secured through a ferrule connection 1 to a conventional bail 3, which bail is pivotally mounted on the end partitions 6R and 6L of the sweeper housing. It will be further observed that the bail 3 is provided with a sleeve 2 permanently secured thereto, which sleeve carries a suitable threaded member that screws into the connecting member 1.

Each end of the bail has an enlarged portion 3a, as shown in Figure 3. In the end of the bail adjacent partition 6L, the corresponding aperture 3d is made small, and has a bearing pin 8 riveted therein, which pin is pivotally mounted in the end partition 6L.

The end of the bail adjacent partition 6R is fashioned as illustrated in Figure 3, and the corresponding aperture 3d is made large enough to pivotally engage the hollow pintle 16 mounted permanently in partition 6R by screws 16a.

A brush 9, of the conventional type, is pivotally supported transversely between end partitions 6R and 6L. Similarly, a pair of dust pans 10, 10 are pivotally mounted transversely between the end partitions 6R and 6L, as illustrated in Figure 6. The relation between the dust pans, brush and bail pivots is shown in Figure 5.

Referring more in detail to Figure 5 it will be observed that the dust pans are connected by a wire spring having an upwardly extending loop. As hereinbefore mentioned, two such springs are ordinarily used, one adjacent the inner face of each partition 6R and 6L, and each is arranged to normally bias the dust pans to their closed positions. To simplify the illustration, only one such spring is shown in the accompanying drawings, and it is to be understood that my invention will perform equally well, insofar as dust pan dumping is concerned, whether one or both springs are used.

A spring lever 13 is pivotally mounted on the end partition 6R by a bearing pin 13a, as illustrated in Figure 4. The free end of spring lever 13 is provided with an upstanding projection 13b, which projection engages the uppermost portion of the inverted spring loop.

As illustrated in Figures 8 and 1, a chain 15, or other flexible connecting member, is secured to projection 13b, which chain passes through hollow pintle 16, and is secured to member 4a of actuating lever 4, as illustrated in Figures 9 and 1.

In the drawing illustrating my invention, a conventional plumbing waste stopper chain 15 is shown, and the chain is secured to spring lever 13 by passing the projection 13b through one of its rectangular openings. In order to assure that the spring 14 remains connected to the spring lever 13, a small loop is fashioned in the uppermost portion of the inverted spring loop through which the projection 13b likewise passes.

As illustrated in Figures 5 and 1, the actuating lever 4 straddles the leg of bail 3 adjacent partition 6R, which lever is pivotally secured to the leg of the bail by pin 5. The upper end of lever 4 is fashioned with a suitable finger grip, and the lower end is provided with a connecting portion 4a having a small aperture therein through which a loop of chain 15 passes. Therefore, to secure the chain 15 to lever 4 a cotter pin 15c or its equivalent is passed through the chain loop, as illustrated in Figure 9.

From the foregoing description it will be apparent that operation of the dust pans is accomplished by moving the actuating lever 4 to the position indicated by the dot-dash lines in Figure 1. Such moving of lever 4 may be accomplished either by pulling or pushing lever 4, according to the preference of the operator.

Therefore, with the lever 4 in the position shown by the full lines, the spring 14 biases the dust pans 10, 10 to their closed positions. Moving lever 4 to the position illustrated by the dot-dash lines, pulls chain 15 and accordingly raises the associated spring 14. Raising the latter spring opens the dust pans. At this time reference is made to the fact that, in order to provide sufficient opening of dust pans 10, 10, it is not necessary to raise the free ends of spring 14 above the center line of pins 12, 12. Accordingly, spring 14 is always positioned for biasing the dust pans 10, 10 toward their closed position. Therefore, closing of the dust pans is accomplished by reason of the biasing action of spring 14 when lever 4 is restored to its normal position illustrated in solid lines in Figs. 1 and 5.

In Figure 5 the usual wheels of the carpet sweeper are indicated by the dot-dash lines 11, 11. It is to be understood that such wheels are ordinarily located adjacent the respective outside faces of partitions 6R and 6L. Accordingly, in the commercial embodiment of my invention dust shields 7R and 7L, indicated by dot-dash lines in Figure 1, are provided, which shields cover the corresponding exterior parts of each end partition.

In Figures 1, 2, 3 and 5, each enlarged end portion 3a of bail 3 is provided with a pin 3b, which pin does not form a part of the dust pan operating mechanisms, but is used in connection with a pressure regulating device for the wheels of the sweeper.

In Figures 10 and 11, a modified arrangement for the spring 14 is illustrated, which arrangement contemplates eliminating the spring lever 13 on low cost sweepers. In this arrangement, the chain 15 is secured to the spring by passing one end of the spring 14 through a loop of the chain, while the other end of the chain is secured to a portion 4a of actuating lever 4 by a connecting link 15a. To provide sufficient alignment of spring 14, when the spring lever 13 is not used, staples 17 or their equivalent, are placed in the end partition 6R as shown in Figures 10 and 11.

Thus, it will be apparent that my invention has provided a very efficient and conveniently operated dust pan dumping mechanism that can be operated independently of the relative positions of the sweeper housing and handle, which mechanism requires the minimum handling of parts of the sweeper by the operator while actuating the dumping mechanism.

Having thus described my invention, I claim:

1. A carpet sweeper comprising, in combination, a dust compartment having a top member and end walls; dust pans within the said compartment pivotally mounted between the said end walls; a spring within the said dust compartment located adjacent the inner surface of one end wall thereof, and extending between the said pans for normally biasing the pans to their closed positions, the said spring having an upwardly extending loop, which is raised to move the said dust pans to their open positions; a handle having a bail pivotally secured to the said end walls above the said upwardly extending loop, the pivotal connection in the said one wall having an aperture therein communicating with the interior of the dust compartment; a lever pivotally secured to the said bail having a projection extending adjacent to the said aperture; and a flexible member extending through the said aperture, and operatively connecting the said projection and the said upwardly extending loop, for raising the said loop to move the pans to their open positions.

2. A carpet sweeper comprising, in combination, a dust compartment having a top member and end walls; a dust pan within the said compartment pivotally mounted between the said end walls; means normally biasing the said pan to a closed position; a handle having a bail pivotally secured to the said end walls, one of said pivotal connections having an aperture therethrough communicating with the interior of the said dust compartment; a lever pivotally secured to the said bail adjacent the said one pivotal connection, the said lever having a projection extending adjacent to the said aperture; and a flexible member extending through the said aperture, and operatively connecting the said projection and said pan, for dumping the said pan, when the said lever is operated.

3. A carpet sweeper casing having dust pans therein; a handle having a bail pivotally secured to the ends of the said casing, one of the said pivotal connections having an aperture therethrough communicating with the interior of the said casing; a dumping lever pivotally secured to the said bail adjacent the said one pivotal connection, and substantially at right angles to the axis of the said one pivotal connection, the said lever having a projection extending adjacent to the said aperture; means operatively connecting the dust pans within the casing; and a flexible member extending through the said aperture, and operatively connecting the said projection and the means within the casing, for dumping the said pans, when the lever is actuated.

4. A carpet sweeper casing, having dust pans pivotally mounted therein between the ends of the said casing; means for holding the said dust pans closed and for dumping the said pans comprising a spring extending between the said pans having an upwardly extending loop which is raised to dump the said dust pans; a handle having a bail pivotally secured to the ends of the casing above the said upwardly extending loop; one of the said pivotal connections having an aperture therethrough communicating with the interior of the casing; a lever pivotally secured to the said bail for movement in a plane substantially containing the axis of the said one pivotal connection, the said lever having a projection extending adjacent to the said aperture; and a flexible member extending through the said aperture, and operatively connecting the said projection and the said upwardly extending loop, for raising the said loop to dump the said pans, when the said lever is actuated.

5. A carpet sweeper casing having dust pans pivotally mounted therein between the end walls thereof; means for holding the said dust pans in a closed position and for dumping the said pans comprising a spring extending between the said pans having an upwardly extending loop which is raised to dump the said pans; a carpet sweeper handle having a bail pivotally secured to the ends of the said casing above the said upwardly extending loop; one of the said pivotal connections having an aperture therethrough communicating with the interior of the casing; a lever pivotally secured to the said bail for movement in a plane substantially containing the axis of the said one pivotal connection, the said lever having a projection extending adjacent to the said aperture; and means extending through the said aperture, and operatively connecting the said projection and the said upwardly extending loop, for raising the said loop to dump the said dust pans, when the said lever is operated.

6. A carpet sweeper casing having dust pans pivotally mounted therein between the end walls thereof; a handle having a bail pivotally secured to the ends of the said casing, one of said pivotal connections having an aperture therethrough communicating with the interior of the casing; a lever pivotally secured to the said bail for movement in a plane substantially containing the axis of the said one pivotal connection, the said lever having a projection extending adjacent to the said aperture; and means, extending through the said aperture and operatively connecting the said pans and said projection, for simultaneously dumping the said pans, when the lever is actuated.

NORMAN W. CUMMINS.